(12) United States Patent
Sasaki et al.

(10) Patent No.: US 7,095,693 B2
(45) Date of Patent: Aug. 22, 2006

(54) OPTICAL DISC DEVICE AND CONTROL METHOD USING PRECEDING SUB-BEAM TO DETECT A DISC DEFECT

(75) Inventors: Takashi Sasaki, Kanagawa (JP); Tsunemitsu Takase, Tokyo (JP)

(73) Assignee: Sony Corporation, Tokyo (JP)

( * ) Notice: Subject to any disclaimer, the term of this patent is extended or adjusted under 35 U.S.C. 154(b) by 473 days.

(21) Appl. No.: 10/092,886

(22) Filed: Mar. 8, 2002

(65) Prior Publication Data
US 2002/0159347 A1   Oct. 31, 2002

(30) Foreign Application Priority Data
Mar. 9, 2001   (JP) ............................... 2001-066499

(51) Int. Cl.
*G11B 7/0045*   (2006.01)
(52) U.S. Cl. ............................... 369/53.15; 369/47.14; 369/47.17; 369/44.32
(58) Field of Classification Search ............ 369/44.32, 369/44.33, 47.14, 53.12, 53.13, 53.15, 53.17, 369/53.42
See application file for complete search history.

(56) References Cited

U.S. PATENT DOCUMENTS

| | | | | |
|---|---|---|---|---|
| 4,355,318 A | * | 10/1982 | Miyauchi | 347/246 |
| 4,571,716 A | * | 2/1986 | Szerlip | 369/53.15 |
| 5,130,965 A | * | 7/1992 | Karaki et al. | 369/44.38 |
| 5,267,226 A | * | 11/1993 | Matsuoka et al. | 369/44.11 |
| 5,365,535 A | * | 11/1994 | Yamaguchi et al. | 369/121 |
| 5,808,991 A | * | 9/1998 | Inoue | 369/53.36 |
| 5,909,418 A | * | 6/1999 | Noda et al. | 369/53.36 |
| 6,088,310 A | * | 7/2000 | Yanagawa | 369/44.38 |
| 6,101,163 A | * | 8/2000 | Kanno et al. | 369/124.1 |
| 6,207,247 B1 | * | 3/2001 | Morita | 428/64.1 |
| 6,246,660 B1 | * | 6/2001 | Yanagawa | 369/116 |
| 6,266,318 B1 | * | 7/2001 | Honda et al. | 369/275.3 |
| 6,377,525 B1 | * | 4/2002 | Iida | 369/47.17 |
| 6,400,664 B1 | * | 6/2002 | Shimano et al. | 369/44.37 |
| 6,690,633 B1 | * | 2/2004 | Roh | 369/53.22 |
| 6,700,842 B1 | * | 3/2004 | Nishi | 369/44.41 |

* cited by examiner

*Primary Examiner*—William Korzuch
*Assistant Examiner*—Michael V. Battaglia
(74) *Attorney, Agent, or Firm*—Oblon, Spivak, McClelland, Maier & Neustadt, P.C.

(57) ABSTRACT

The invention relates to an optical disc device and a control method for the optical disc device. The presence of defects on an optical disc is confirmed by, based on the result of detecting a return light corresponding to a sub-beam spot used for tracking control, which is formed on the preceding side with respect to scan of a main beam spot, suppressing changes in signal level of the light detection result caused upon boosting of the laser power of a laser beam. Also, whether data can be correctly reproduced is determined by, based on the result of detecting a return light corresponding to a sub-beam spot used for tracking control, which is formed on the succeeding side with respect to scan of the main beam spot, suppressing changes in signal level caused upon writing of the data. Therefore, whether data can be correctly reproduced can be confirmed with a simple construction while effectively avoiding a reduction of the data transfer rate.

16 Claims, 9 Drawing Sheets

OPTICAL DISC DEVICE AND CONTROL METHOD USING PRECEDING SUB-BEAM TO DETECT A DISC DEFECT

BACKGROUND OF THE INVENTION

1. Field of the Invention

The present invention relates to an optical disc device and a control method for the optical disc device, and is applicable to an optical disc device for recording and reproducing data on and from an optical disc, such as a CD-R. More particularly, the present invention intends to make it possible to confirm whether data can be correctly reproduced, with a simple construction while effectively avoiding a reduction of the data transfer rate, by suppressing changes in signal level caused upon boosting of the laser power of a laser beam and detecting the presence of defects on an optical disc based on the result of detecting a return light corresponding to a sub-beam spot used for tracking control, which is formed on the preceding side with respect to scan of a main beam spot used to form pits or marks for recording of the data. Also, the present invention intends to make it possible to confirm whether data can be correctly reproduced, with a simple construction while effectively avoiding a reduction of the data transfer rate, by suppressing changes in signal level caused upon writing of the data and determining whether the recorded data and address data can be correctly reproduced, based on the result of detecting a return light corresponding to a sub-beam spot used for tracking control, which is formed on the succeeding side with respect to scan of a main beam spot used to form pits or marks for the recording of the data.

2. Description of the Related Art

Hitherto, in an optical disc device for recording and reproducing data on and from an optical disc, such as a CD-R (Compact Disc Recordable), a CD-RW (Compact Disc Rewritable) and DVD-R (Digital Video Disc Recordable), the so-called verifying operation has been required after the end of recording by, for example, accessing a recorded area again for the purpose of confirming that the recorded data is correctly reproduced.

More specifically, an optical disc device generally executes such a confirming process in two stages of, after recording data in predetermined amount, accessing the recorded area again to reproduce the data and determining a reproduced result. In this connection, the following method is also proposed. Based on a confirmation result, a retry is executed as required. An area, in which data cannot be correctly reproduced even after repeating such a retry, is determined to be a defective area. Then, with the so-called alternative process, the data is recorded in another area other than the defective area.

According to another proposed method, the confirming process and the recording process are simultaneously executed in parallel by arranging two optical pickups, i.e., one for recording and the other for reproducing, recording desired data with the recording pickup, and at the same time reproducing the data, which has been just recorded, with the reproducing pickup. As an alternative method for simultaneously executing the confirming process and the recording process in parallel, it has been further proposed to provide a defect detecting mechanism on an optical pickup and to detect defects with the defect detecting mechanism.

However, the above-described conventional methods have problems as follows. With the method of, after recording data in predetermined amount, reproducing the recorded data and determining a reproduced result, two recording and reproducing processes are alternatively repeated in recording of continuous data, thereby resulting in a substantial reduction of the data transfer rate.

On the other hand, with the method employing the recording pickup and the reproducing pickup, a reduction of the data transfer rate can be effectively avoided, but the overall construction becomes complicated because of the necessity of arranging the two optical pickups.

Further, with the method providing the defect detecting mechanism on the optical pickup, a reduction of the data transfer rate can also be effectively avoided, but the optical pickup has a complicated construction and the overall construction becomes complicated correspondingly.

SUMMARY OF THE INVENTION

In view of the state of the art set forth above, it is an object of the present invention to provide an optical disc device and a control method for the optical disc device, which can confirm with a simple construction whether data is correctively reproduced, while effectively avoiding a reduction of the data transfer rate.

According to a first aspect of the present invention, there is provided an optical disc device in which a main beam spot and sub-beam spots are formed on an information recording surface of an optical disc with irradiation of a laser beam, and laser power of the laser beam is intermittently boosted to record desired data on the optical disc by the main beam spot, the optical disc device comprising a light receiving unit for receiving a return light corresponding to one of the sub-beam spots, which is formed on preceding side with respect to scan of the main beam spot, and outputting a light detection result; a correcting unit for suppressing changes in signal level of the light detection result caused upon boosting of the laser power of the laser beam; and a determining unit for determining the light detection result obtained through the correcting unit, and detecting the presence of defects on the optical disc.

Also, there is provided an optical disc device comprising a light source for emitting a laser beam; a diffraction grating for generating a main optical beam and at least first and second optical beams from the laser beam emitted from the light source, and forming a main beam spot and sub-beam spots on an information recording surface of an optical disc; a photo detector for receiving a return light corresponding to one of the sub-beam spots, which is formed on preceding side with respect to scan of the main beam spot, and outputting a light detection result; and a determination circuit for determining the light detection result of the photo detector, and detecting the presence of defects on the optical disc.

According to a second aspect of the present invention, there is provided a control method for an optical disc device in which a main beam spot and sub-beam spots are formed on an information recording surface of an optical disc with irradiation of a laser beam, and laser power of the laser beam is intermittently boosted to record desired data on the optical disc by the main beam spot, the method comprising the steps of suppressing changes in signal level of a light detection result caused upon boosting of the laser power of the laser beam, the light detection result being obtained by receiving a return light corresponding to one of the sub-beam spots, which is formed on preceding side with respect to scan of the main beam spot; and determining the light detection result and detecting the presence of defects on the optical disc.

According to a third aspect of the present invention, there is provided an optical disc device in which a main beam spot and sub-beam spots are formed on an information recording surface of an optical disc with irradiation of a laser beam, and laser power of the laser beam is intermittently boosted to record desired data on the optical disc by the main beam spot, the optical disc device comprising a light receiving unit for receiving a return light corresponding to one of the sub-beam spots, which is formed on succeeding side with respect to scan of the main beam spot, and outputting a light detection result; a correcting unit for suppressing changes in signal level of the light detection result caused upon boosting of the laser power of the laser beam; and a determining unit for processing the light detection result obtained through the correcting unit, and determining an error in the data recorded on the optical disc by the main beam spot and an error in address data obtained from the optical disc.

Also, there is provided an optical disc device comprising a light source for emitting a laser beam; a diffraction grating for generating a main optical beam and at least first and second optical beams from the laser beam emitted from the light source, and forming a main beam spot and sub-beam spots on an information recording surface of an optical disc; a photo detector for receiving a return light corresponding to one of the sub-beam spots, which is formed on succeeding side with respect to scan of the main beam spot, and outputting a light detection result; and a determination circuit for processing the light detection result obtained from the light receiving unit, and determining an error in the data recorded on the optical disc by the main beam spot and an error in address data obtained from the optical disc.

According to a fourth aspect of the present invention, there is provided a control method for an optical disc device in which a main beam spot and sub-beam spots are formed on an information recording surface of an optical disc with irradiation of a laser beam, and laser power of the laser beam is intermittently boosted to record desired data on the optical disc by the main beam spot, the method comprising the steps of suppressing changes in signal level of a light detection result caused upon boosting of the laser power of the laser beam, the light detection result being obtained by receiving a return light corresponding to one of the sub-beam spots, which is formed on succeeding side with respect to scan of the main beam spot; and processing the light detection result, and determining an error in the data recorded on the optical disc by the main beam spot and an error in address data obtained from the optical disc.

According to the first aspect of the present invention, the optical disc device comprises the light receiving unit for receiving a return light corresponding to one of the sub-beam spots, which is formed on preceding side with respect to scan of the main beam spot, and outputting a light detection result, and the determining unit for determining the light detection result and detecting the presence of defects on the optical disc. Therefore, the state of the information recording surface can be determined for an area, which is just going to be scanned by the main beam spot, by using the sub-beam spot for tracking control while data is recorded by the main beam spot. Also, since the optical disc device further comprises the correcting unit for suppressing changes in signal level of the light detection result caused upon boosting of the laser power of the laser beam, the state of the information recording surface can be determined with high reliability by avoiding an adverse effect of changes in laser power of the laser beam caused upon recording of the data. As a result, it is possible to confirm with a simple construction, while effectively avoiding a reduction of the data transfer rate.

According to the second aspect of the present invention, the control method for the optical disc device is provided which can confirm with a simple construction whether data is correctively reproduced, while effectively avoiding a reduction of the data transfer rate.

According to the third aspect of the present invention, the optical disc device comprises the light receiving unit for receiving a return light corresponding to one of the sub-beam spots, which is formed on succeeding side with respect to scan of the main beam spot, and outputting a light detection result, and the determining unit for processing the light detection result and determining an error in the data recorded on the optical disc by the main beam spot and an error in address data obtained from the optical disc. Therefore, whether the recorded data and address data can be correctly reproduced can be determined for an area, which is in a state immediately after being scanned by the main beam spot, by using the sub-beam spot for tracking control while data is recorded by the main beam spot. Also, since the optical disc device further comprises the correcting unit for suppressing changes in signal level of the light detection result caused upon boosting of the laser power of the laser beam, whether the recorded data and the address data can be correctly reproduced can be determined with high reliability by avoiding an adverse effect of changes in laser power of the laser beam caused upon recording of the data. As a result, it is possible to confirm with a simple construction whether data can be correctly reproduced, while effectively avoiding a reduction of the data transfer rate.

According to the fourth aspect of the present invention, the control method for the optical disc device is provided which can confirm with a simple construction whether data is correctively reproduced, while effectively avoiding a reduction of the data transfer rate.

DESCRIPTION OF THE PREFERRED EMBODIMENTS

Preferred embodiments of the present invention will be described below with reference to the drawings.

(1) First Embodiment

(1-1) Construction of First Embodiment

Figure 2:
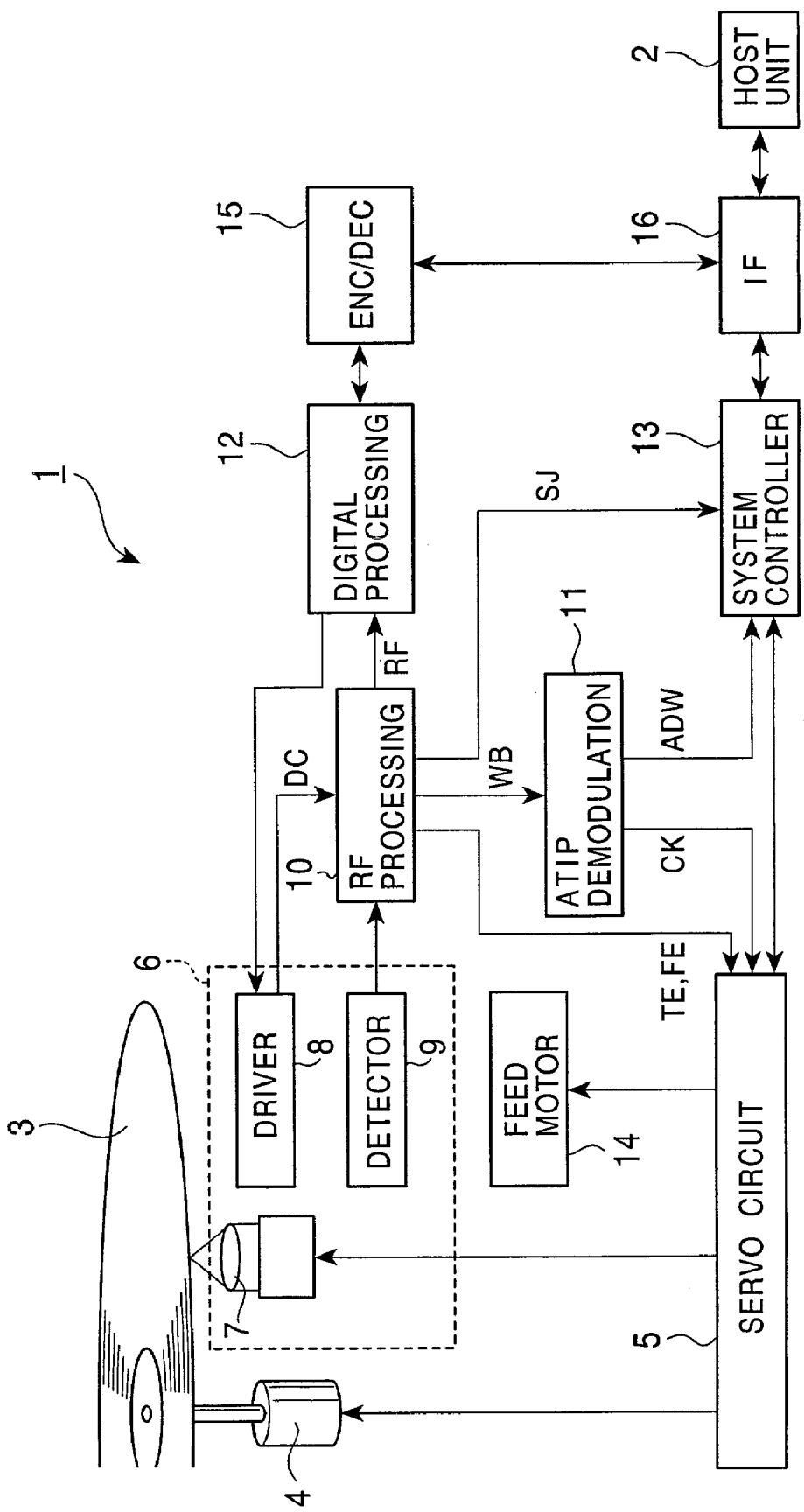
FIG. 2 is a block diagram showing an overall construction of the optical disc device shown in FIG. 1.

FIG. 2 is a block diagram showing an overall construction of an optical disc device according to the first embodiment of the present invention. An optical disc device 1 of this embodiment records desired data on an optical disc 3 and reproduces data recorded on the optical disc 3 under control of a host unit 2. The optical disc 3 is a CD (Compact Disc), a CD-ROM, a CD-R or a CD-RW.

Figure 3:
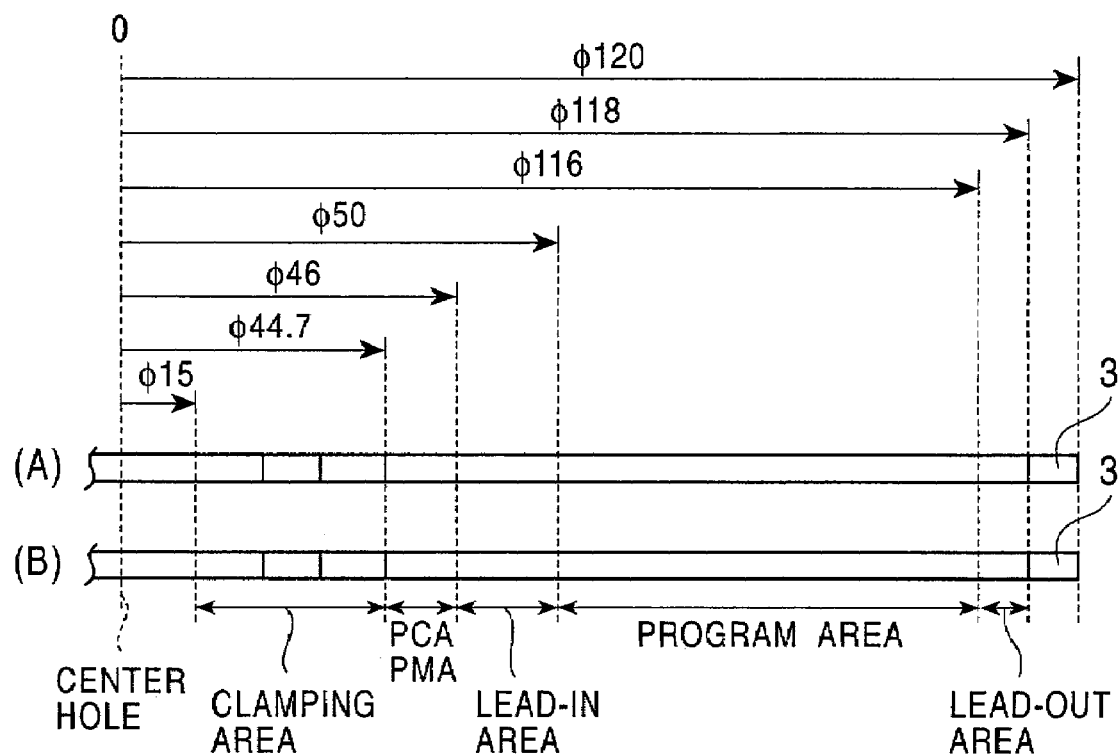
FIGS. 3A and 3B are each a sectional view for explaining an optical disc used in the optical disc device shown in FIG. 1.

As shown in a sectional view of FIG. 3, each of a CD and a CD-ROM has a center hole formed at the center and having a diameter of 15 mm, and is chucked in a clamping area defining an innermost circular area about the center O of the center hole. Also, an area having a diameter of 46 mm to 50 mm and an area having a diameter of 50 mm to 116 mm about the center O of the center hole are assigned to a lead-in area and a program area, respectively. User data is recorded in the program area, and management data for the user data, etc. are recorded in the lead-in area. Further, a lead-out area is assigned outside the lead-in area and the program area.

A CD-R and a CD-RW have the same outer shape as a CD and a CD-ROM, and each have a lead-in area, a program area and a lead-out area which are formed similarly to those of a CD and a CD-ROM. Further, a CD-R and a CD-RW each have, inside the lead-in area, a PCA (Power Calibration Area) for a laser beam during recording and a PMA (Program Memory Area) temporarily recording address information necessary for subsequent recording.

Figure 4:
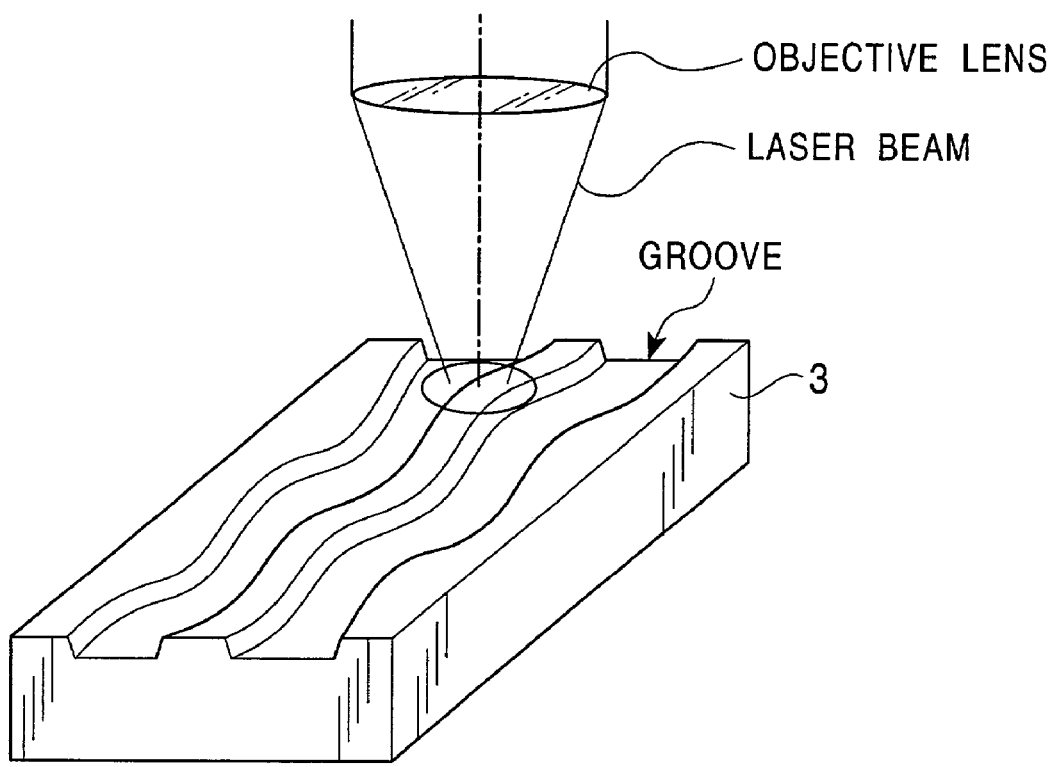
FIG. 4 is a perspective view for explaining the optical disc shown in FIG. 3.

In a CD and a CD-ROM, user data is recorded in the form of pit rows, and address information is recorded as sub-code in a multiplexed relation to the user data. In a CD-R and a CD-RW, as shown in FIG. 4, grooves in the shape of guide grooves or ribs are concentrically formed by a laser beam, and address information is recorded in the form of meandering of the grooves.

In the optical disc device 1, a spindle motor 4 drives the optical disc 3 to rotate at a predetermined speed under control of a servo circuit 5. An optical pickup 6 is held to be able to move in the radial direction of the optical disc 3, and emits a laser beam from a built-in semiconductor laser under control of a driver 8. The optical pickup 6 causes the laser beam to be irradiated to the optical disc 3 through an objective lens 7 and a predetermined optical system. Also, the optical pickup 6 operates under control of the driver 8 such that the laser power of the laser beam is held constant in the reproduction mode, while the laser power of the laser beam is boosted in the recording mode at predetermined timing. With boosting of the laser power, mark rows or pit rows are formed in or on the optical disc 3 for recording of desired data.

Further, the optical pickup 6 receives the light, which is returned from the optical disc upon irradiation of the laser beam, through the objective lens 7, and introduces the returned light to a detector 9 through the predetermined optical system. The detector 9 receives the returned light and outputs a light detection result from the optical pickup 6. Through processing of the light detection result, the optical pickup 6 can produce signals necessary for various kinds of control and reproduce data recorded on the optical disc 3.

More specifically, an RF processing circuit 10 processes the light detection result through current-to-voltage conversion and then matrix operations, thereby generating and outputting a tracking error signal TE whose signal level varies depending on a tracking error amount, a focusing error signal FE whose signal level varies depending on a focusing error amount, a wobble signal WB whose signal level varies depending on meandering of the groove formed in the optical disc 3, and a reproduction signal RF whose signal level varies depending on the pit rows or the mark rows formed in or on the optical disc 3.

An ATIP (Absolute Time In Pregroove) demodulation circuit 11 detects a carrier signal of the wobble signal WB to produce a clock CK, and processes the wobble signal WB on the basis of the carrier signal to detect address information ADW recorded in the form of meandering of the groove.

The servo circuit 5 moves the object lens 7 in the optical pickup 6 in accordance with the tracking error signal TE and the focusing error signal FE to perform tracking control and focusing control. Also, where the optical disc 3 is one dedicated for reproduction, the servo circuit 5 controls the rotational speed of the spindle motor 4 so that the clock detected through processing of the reproduction signal RF by a digital processing circuit 12 has a predetermined frequency. Where the optical disc 3 is a recordable or rewritable one, the servo circuit 5 controls the rotational speed of the spindle motor 4 so that the clock CK detected by the ATIP demodulation circuit 11 has a predetermined frequency. Further, the servo circuit 5 drives a feed motor 14 under control of a system controller 13, for causing the optical pickup 6 to perform the seek operation.

The digital processing circuit 12 reproduces the clock from the reproduction signal RF and executes binary discrimination of the reproduction signal RF on the basis of the clock for generating reproduction data with binary-coding of the reproduction signal RF at the timing of the clock.

In the reproduction mode, an encoder/decoder (ENC/DEC) 15 processes the reproduction data through EFM (Eight to Fourteen Modulation) demodulation, deinterleaving and error correction, thereby reproducing the user data recorded on the optical disc 3 and outputting the reproduced user data to an interface (IF) 16. Conversely, in the recording mode, the encoder/decoder (ENC/DEC) 15 adds an error correcting code to the data outputted from the interface 16, and then processes it through interleaving and EFM, thereby reproducing and outputting a recording signal used to drive the driver 8. Where the optical disc 3 is a CD or a CD-ROM, the encoder/decoder 15 reproduces sub-code data and outputs it to the system controller 13.

The interface 16 notifies commands outputted from the host unit 2 to the system controller 13, and also notifies responses from the system controller 13 to the host unit 2. Through such transfer of commands and responses, the interface 16 accepts inputting of data to be recorded and outputs the data to the encoder/decoder 15, and conversely data reproduced by the encoder/decoder 15 to the host unit 2.

The system controller 13 is a computer for controlling the operation of the optical disc device 1. Specifically, the system controller 13 analyzes commands inputted via the interface 16 from the host unit 2 and switches over the overall operation in accordance with an analyzed result.

Figure 1:
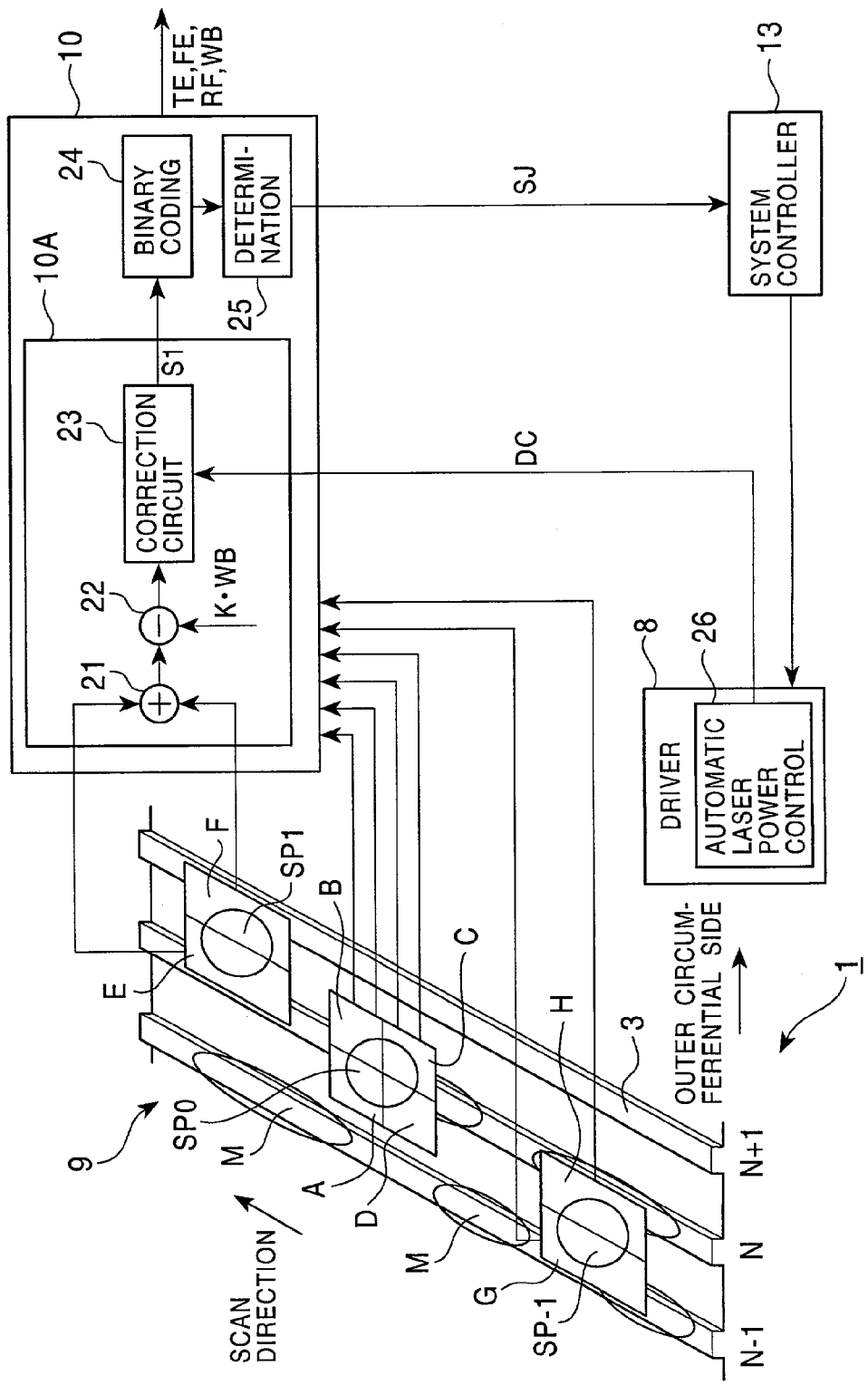
FIG. 1 is a block diagram showing an optical disc device according to a first embodiment of the present invention.

FIG. 1 is a block diagram for explaining a laser beam irradiated to the optical disc 3 in the optical disc device 1 according to the first embodiment. The optical disc device 1 of this embodiment executes a process of tracking control based the 3-spot method. To describe in more detail, in the optical disc device 1, the optical pickup 6 includes a diffraction grating or a hologram situated between the semiconductor laser and the objective lens for decomposing the laser beam into diffracted lights of −1, 0 and +1 orders, which are irradiated to the optical disc 3. Thus, the optical pickup 6 forms, on the optical disc 3, a main beam spot SP0 with a main beam, i.e., the diffracted light of 0 order, and sub-beam spots SP-1, SP1 with side beams, i.e., the diffracted lights of −1 and +1 orders, on both sides of the main beam spot SP0.

The optical system of the optical pickup 6 is set such that when the main beam spot SP0 is positioned at the center of the N-th track, the sub-beam spots SP-1, SP1 are formed at positions offset about a ½ track pitch in directions toward inner and outer circumferential sides of the optical disc 3, respectively. Further, light receiving surfaces of the detector 9 are formed so as to receive respective return lights corresponding to the beam spots SP-1, SP0 and SP1. For clarifying the relationship between the beam spots SP-1, SP0, SP1 and the detector 9, in FIG. 1, the light receiving surfaces of the detector 9 are illustrated in a superimposed relation to the beam spots SP-1, SP0 and SP1.

More specifically, the detector 9 receives the return lights corresponding to the beam spots SP-1, SP0 and SP1 at the light receiving surfaces each having a rectangular shape. Of those light receiving surfaces, the light receiving surfaces receiving the return lights corresponding to the sub-beam spots SP-1, SP1 are divided respectively into first and second areas E, F; G, H by division lines extending in the circumferential direction of the optical disc 3, and output respective light detection results indicating the amounts of light received by the areas E to H. On the other hand, the light receiving surface receiving the return light corresponding to the main beam spot SP0 is divided into four areas A to D by two division lines, i.e., one extending in the circumferential direction of the optical disc 3 and the other extending in the radial direction of the optical disc 3, and outputs respective light detection results indicating the amounts of light received by the areas A to D.

Then, in the optical disc device 1, the light detection results from the areas A to H are processed to generate the tracking error signal TE, the focusing error signal FE, the wobble signal WB, and the reproduction signal RF. Further, in the optical disc device 1, desired data is recorded and recorded data is reproduced using the main beam spot SP0 formed as described above, whereas the sub-beam spots SP-1, SP1 are utilized to generate the tracking error signal TE in combination with the main beam spot SP0.

More specifically, the RF processing circuit 10 processes the respective light detection results outputted from the areas A to H through current-to-voltage conversion and then matrix operations, thereby generating the tracking error signal TE, the focusing error signal FE, the wobble signal WB and the reproduction signal RF. In that process, the RF processing circuit 10 generates the tracking error signal TE based on the so-called DPP (Differential Push Pull) method.

In practice, assuming that results outputted with the current-to-voltage conversion of the light detection results obtained from the areas A to H are denoted by A to H, respectively, the RF processing circuit 10 generates the reproduction signal RF, the focusing error signal FE, the tracking error signal TE, and the wobble signal WB using arithmetic operations expressed by the following formulae:

$$RF=A+B+C+D$$

$$FE=(A+C)-(B+D)$$

$$TE=(E-F)+(G-H)-k((A+D)-(B+C))$$

$$WB=(A+D)-(B+C) \quad (1)$$

Further, in this embodiment, the RF processing circuit 10 selectively processes, in the recording mode, those of the light detection results obtained from the areas A to H, which are obtained from the areas E and F receiving the return light corresponding to the sub-beam spot SP1 formed on the preceding side with respect to the scan of the main beam spot SP0, thereby detecting defects on the optical disc 3. Herein, the term "preceding side" means the side in which the relevant area is scanned by the sub-beam spot earlier than scanned by the main beam spot SP0 regardless of the radial direction and the circumferential direction of the optical disc 3.

In the optical disc device 1, the sub-beam spot SP1 formed by the diffracted light of +1 order scans the optical disc 3 prior to the main beam spots SP0 with respect to both the circumferential direction and the radial direction of the optical disc 3. Hence, the RF processing circuit 10 inputs, to a computing circuit 10A, the results outputted with the current-to-voltage conversion of the light detection results (the former converted results being also referred to simply as the "light detection results" hereinafter) obtained from the areas E and F receiving the return light corresponding to the diffracted light of +1 order. Based on the light detection results obtained from the areas E and F, the computing circuit 10A generates a reflectance detection signal S1 whose signal level varies depending on the reflectance of the optical disc 3.

More specifically, the computing circuit 10A inputs the light detection results obtained from the areas E and F to an adder 21 for addition of them. Then, a subtracter 22 subtracts, from an output signal of the adder 21, a wobble signal (denoted by K·WB) that has been corrected in phase and signal level (amplitude). As a result, the computing circuit 10A reduces a signal level varying with the meandering form of the groove from the result of detecting the amount of the return light corresponding to the diffraction of +1 order.

Further, a succeeding correction circuit 23 in the computing circuit 10A suppresses changes in signal level of the light detection result, which varies upon boosting of the laser power of the laser beam. More specifically, the correction circuit 23 is constituted by a divider for correcting an output signal level of the subtracter 22 based on a result of detecting the laser power of the laser beam irradiated to the optical disc 3. As a result, the computing circuit 10A suppresses changes in signal level of the result of detecting the amount of the return light corresponding to the diffraction of +1 order, which varies upon boosting of the laser power of the laser beam.

In the optical pickup 6, the laser power of the laser beam irradiated to the optical disc 3 can be detected by receiving a laser beam, which is emitted from the so-called rear side of the semiconductor laser, with a light receiving device. Based on a result of detecting the laser power of such a rear-side laser beam, an automatic laser power control circuit 26 built in the driver 8 corrects variations in the laser power of the laser beam. The automatic laser power control circuit 26 outputs, to the correction circuit 23, a result DC of detecting the laser power of the laser beam, which is employed for correcting the laser power of the laser beam. The correction circuit 23 corrects the output signal level of the subtracter 22 in accordance with the laser power detection result DC.

Thus, the computing circuit 10A generates, based on the results of detecting the return lights obtained from the preceding sub-beam spot SP1, the reflectance detection signal S1 whose signal level varies depending on changes in the reflectance of the optical disc 3. The reflectance detection signal S1 thus generated has a signal level varying with the presence of defects such as fingerprints, contamination and flaws attached to or formed on the optical disc. The presence of those defects deteriorates an error rate detected from the optical disc 3.

A succeeding binary coding circuit 24 in the RF processing circuit 10 converts the reflectance detection signal S1 into binary values in accordance with a predetermined decision level, and outputs a defect detection signal whose signal level rises due to the presence of defects on an information recording surface of the optical disc 3.

A determination circuit 25 executes transfer integral of the defect detection signal during a predetermined integral period and determines a result of the transfer integral in accordance with a predetermined decision level. Then, the determination circuit 25 notifies a determination result SJ if a defect in the area scanned by the sub-beam spot SP1 has a size not smaller than a predetermined value. Also, the determination circuit 25 detects a frequency of rising of the defect detection signal on the basis of a predetermined determination period, and then notifies a determination result SJ based on the frequency determination if a defect occurs repeatedly in the area scanned by the sub-beam spot SP1. Additionally, parameters used in the determination circuit 25, such as the decision level, the integral period and/or the decision period, are changed depending on a recording rate with setting of the system controller 13. In other words, the determination circuit 25 is set so as to inform the determination result SJ if it is determined that an error occurs in spite of data being recorded in an ordinary manner.

Upon notification of the determination result SJ, the system controller 13 changes the amount of light for writing, i.e., the laser power of the laser beam for forming a mark M, under control of the driver 8 to such an extent that data can be correctly reproduced even in the area where the determination result SJ implies the presence of a large defect or repeated defects. Practically, in this embodiment, the system controller 13 boosts the laser power of the laser beam in writing upon notification of the determination result SJ, thereby changing the laser power of the laser beam.

In this embodiment described above, the light receiving surface made up of the areas E and F constitutes light receiving means for receiving the return light corresponding to the sub-beam spot formed on the preceding side with respect to the scan of the main beam spot. The computing circuit 10A constitutes correcting means for suppressing not only changes in signal level of the light detection result caused upon boosting of the laser power of the laser beam, but also changes in signal level of the light detection result caused with meandering of the groove formed in the optical disc. Further, the binary coding circuit 24 and the determination circuit 25 constitute determining means for determining the light detection result obtained through the correcting means, and detecting defects on the optical disc.

(1-2) Operation of First Embodiment

In the construction described above, when reproduction of data from the optical disc 3 is instructed from the host unit 2 in the optical disc device 1 (FIG. 2), the result of detecting the return light obtained by irradiating the laser beam to the optical disc 3 from the optical pickup 6 is processed by the RF processing circuit 10 to generate the reproduction signal RF whose signal level varies depending on the pit rows or the mark rows formed in or on the optical disc 3. Then, the reproduction signal RF is processed by the digital processing circuit 12 to generate reproduction data, and the encoder/decoder 15 processes the reproduction data. As a result, the data recorded on the optical disc 3 is reproduced. The data thus reproduced in the optical disc device 1 is outputted to the host unit 2 via the interface 16.

On the other hand, when recording of data on the optical disc 3 is instructed from the host unit 2, data to be recorded is successively inputted via the interface 16. The inputted data is processed by the encoder/decoder 15 and then by the digital processing circuit 12 to generate a recording signal, which is used for control of the laser beam. The operation of the driver 8 is controlled in accordance with the recording signal so that the laser power of the laser beam irradiated to the optical disc 3 from the optical pickup 6 is intermittently boosted from a level for reproduction to a level for writing. As a result, pit rows or mark rows are formed in or on the optical disc 3.

When recording and reproducing data on and from the optical disc 3 in the optical disc device 1 (FIG. 1) as described above, the laser beam emitted from the semiconductor laser is decomposed into diffracted lights of −1, 0 and +1 orders, which are irradiated to the optical disc 3. Those diffracted lights of −1, 0 and +1 orders form the sub-beam spot SP-1, the main beam spot SP0 and the sub-beam spot SP1, respectively, on the information recording surface of the optical disc 3. Then, return lights corresponding to the sub-beam spot SP-1, the main beam spot SP0 and the sub-beam spot SP1 are introduced to the detector 9 and received by the light receiving surface made up of the areas G and H, the light receiving surface made up of the areas A to D, and the light receiving surface made up of the areas E and F, respectively.

Further, in the optical disc device 1, the light detection results obtained from the areas A to H are processed in the RF processing circuit 10 through current-to-voltage conversion and then matrix operations, thereby generating the tracking error signal TE, the focusing error signal FE, the wobble signal WB, and the reproduction signal RF. Tracking control and focusing control of the optical pickup 6 are performed in accordance with the tracking error signal TE and the focusing error signal FE. User data is reproduced from the reproduction signal RF through the above-described processing executed by the digital processing circuit 12, etc.

In those processes, the optical disc device 1 generates the tracking error signal TE by the DPP method using the results of detecting the return lights corresponding to the main beam spot SP0 and the sub-beam spots SP-1, SP1. Also, the laser power of the laser beam emitted from the semiconductor laser is detected. Under control of the automatic laser power control circuit 26 based on the light detection results, the laser power of the laser beam is held at a constant level in the reproduction mode, and is intermittently boosted depending on the recording signal from a level for reproduction to a level for writing in the recording mode.

In the return-light detection results, there occur not only changes in respective signal levels, which used for generating the tracking error signal and other signals, but also changes in respective signal levels depending on the reflectance of an area to which the laser beam is irradiated, boosting of the laser power of the laser beam up to a level required for writing, and meandering of the groove formed in the optical disc. Further, the reflectance of the optical disc 3 varies with the presence of defects such as fingerprints, contamination and flaws attached to or formed on the optical disc 3. The presence of those defects significantly deteriorates an error rate detected in defective areas of the optical disc 3 as compared with that detected in other normal areas.

In the optical disc device 1, of the light detection results obtained from the areas A to H, those ones obtained from the areas E and F corresponding to the sub-beam spot SP1, which is positioned on the preceding side with respect to the main beam spot SP0, are added by the adder 21 of the computing circuit 10A in the RF processing circuit 10. For an area in which data is going to be recorded with scan of the main beam spot SP0, it is hence possible to obtain, before the scan of the main beam spot SP0, the light detection result whose signal level varies depending on the reflectance of that area, boosting of the laser power of the laser beam, and the meandering form of the groove.

Further, in the computing circuit 10A, the succeeding subtracter 22 reduces a wobble signal component from the above light detection result, and the succeeding correction circuit 23 suppresses the signal level of a component varied upon boosting of the laser power of the laser beam. As a result, the reflectance detection signal S1 having a signal level varied depending on the reflectance of the area, to which the sub-beam spot is irradiated, is obtained in the optical disc device 1. The signal level of the reflectance detection signal S1 thus obtained varies with the presence of defects such as fingerprints, contamination and flaws attached to or formed on the optical disc.

Then, in the optical disc device 1, the succeeding binary coding circuit 24 converts the reflectance detection signal S1 into binary values for determining the presence of defects. Whether data can be correctly reproduced is thereby determined. The succeeding determination circuit 25 calculates a transfer integral value and counts the number of rises of the signal level during a predetermined period to determine the occurrence of large defects and the occurrence of many small defects. Based on the determination result SJ from the determination circuit 25, the system controller 13 boosts the laser power of the laser beam used for writing to prevent deterioration of the error rate when there occur those large defects and those many small defects.

Thus, according to the optical disc device 1, whether data can be correctly reproduced is determined by utilizing one SP-1 of the sub-beam spots SP1, SP-1 used for the tracking control, which is positioned on the preceding side with respect to the main beam spot SP0, and the laser power of the laser beam is controlled in accordance with the determination result so as to effectively avoid errors. The optical disc device 1 is therefore able to confirm whether data can be correctly reproduced is determined, with a simple construction obtained just by adding the computing circuit 10A, the binary coding circuit 24, etc. to the processing circuit that processes an output of the optical pickup 6.

(1-3) Advantages of First Embodiment

With the construction described above, the result of detecting the return light corresponding to the sub-beam spot used for the tracking control, which is positioned on the preceding side with respect to the scan of the main beam spot used for recording, is processed so as to suppress changes in signal level caused upon boosting of the laser power of the laser beam and to detect the presence of defects on the optical disc. Consequently, whether data can be correctly reproduced can be confirmed with a simple construction while effectively avoiding a reduction of the data transfer rate.

Also, since the light detection result is processed so as to suppress the signal level of a component varied with the meandering form of the groove, it is possible to effectively avoid an adverse effect due to the meandering form of the groove, and to correctly detect areas in which defects occur.

Further, the sub-beam spot used for the tracking control is one of a pair of beam spots formed on both sides of a main beam spot according to the 3-spot method, which is positioned on the preceding side in both the circumferential direction and the radial direction of the optical disc. Therefore, whether data can be correctly reproduced in an area, which is just going to be scanned by the main beam spot, can be confirmed by detecting the presence of defects in that area while effectively utilizing the sub-beam spot according to the 3-spot method.

Moreover, deterioration in the error rate can be prevented by changing the amount of light irradiated for writing in accordance with the defect detection result thus obtained.

(2) Second Embodiment

Figure 5:
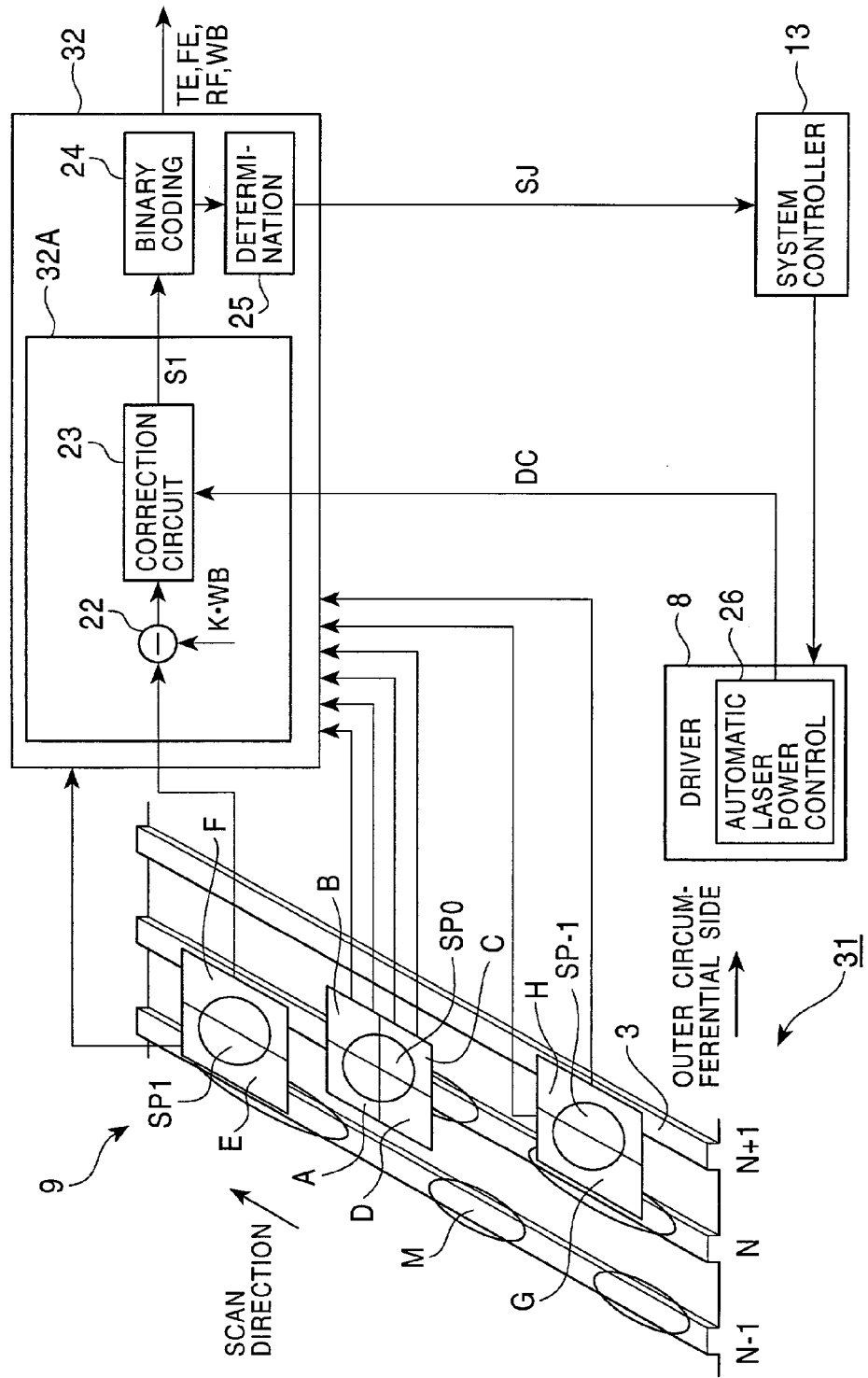
FIG. 5 is a block diagram showing an optical disc device according to a second embodiment of the present invention.

FIG. 5 is a block diagram showing, in comparison with FIG. 1, an optical disc device according to a second embodiment of the present invention. In an optical disc device 31 of this embodiment, the sub-beam spots SP-1, SP1 are formed by respective side beams in arrangement reversed to that in the first embodiment with respect to the radial direction of the optical disc 3, and an RF processing circuit 32 is employed instead of the RF processing circuit 10 described above in connection with the first embodiment. Except for those points, the optical disc device 31 of this embodiment has the same construction as optical disc device 1 of the first embodiment. Note that, in the construction shown in FIG. 5, the same points as those in the first embodiment are not described here.

In this embodiment, the sub-beam spot SP-1 formed by the diffracted light of −1 order is formed on the preceding side with respect to the main beam spot SP0 as viewed in the radial direction of the optical disc 3, but on the succeeding side with respect to the main beam spot SP0 as viewed in the circumferential direction of the optical disc 3. On the other hand, the sub-beam spot SP1 formed by the diffracted light of +1 order is formed on the succeeding side with respect to the main beam spot SP0 as viewed in the radial direction of the optical disc 3, but on the preceding side with respect to the main beam spot SP0 as viewed in the circumferential direction of the optical disc 3.

In this embodiment, therefore, the amount of the return light corresponding to each of the sub-beam spots SP-1 and SP1 is changed under the effect of pits or marks formed by the main beam spot SP0 in or on the information recording surface of the optical disc. This means that the correct determination as to the presence of defects is not ensured with similar processing as that in the first embodiment regardless of which one of the light detection results obtained from the sub-beam spots SP-1 and SP1 is employed in the processing. For that reason, in this embodiment, deterioration of accuracy in defect detection, which is attributable to pits or marks formed by the main beam spot SP0, is prevented by effectively utilizing the arrangement that the light receiving surfaces receiving the return lights corresponding to the sub-beam spots SP-1 and SP1 are each divided in the radial direction of the optical disc 3.

Practically, in the optical disc device 31 of this embodiment, the presence of defects is detected by selectively processing the light detection result obtained from one of areas of the light receiving surface receiving the sub-beam spot on the preceding side in the radial direction of the optical disc 3, i.e., the light detection result obtained from the area F receiving the light returned from the side nearer to the outer circumference of the optical disc 3 (namely, the side in which a pit or a mark is not yet formed).

More specifically, as with the RF processing circuit 10, the RF processing circuit 32 generates the tracking error signal TE, the focusing error signal FE, the wobble signal WB, and the reproduction signal RF. Further, the RF processing circuit 32 inputs, to the computing circuit 32A, the light detection result obtained from the area F and subjected to current-to-voltage conversion. In the computing circuit 32A, the wobble signal K·WB having been corrected in phase and amplitude is subtracted from the inputted signal to suppress changes in signal level of the light detection result obtained from the area F, which are caused with the meandering form of the groove. In the succeeding correction circuit 23, the signal level of the light detection result obtained from the area F is corrected based on the laser power detection result DC for the irradiated laser beam, which is detected and outputted from the automatic laser power control circuit 26, thereby suppressing the signal level of a component varied upon boosting of the laser power of the laser beam and then generating the reflectance detection signal S1.

Thus, with the construction of FIG. 5, the presence of defects is detected by selectively processing the light detection result obtained from one F of the divided areas of the light receiving surface, which is positioned on the side in which a pit or a mark is not yet formed. Consequently, even when the light detection results obtained from the pair of sub-beam spots are both affected with the presence of the pit or the mark formed by the main beam spot, it is possible to effectively avoid such an adverse effect, and to confirm whether data can be correctly reproduced.

(3) Third Embodiment

In this embodiment, instead of controlling the laser power of the laser beam based on the determination result SJ, data is rerecorded in a succeeding area with the so-called slipping process while writing is temporarily suspended. To that end, the system controller processes the management information, which is recorded on the inner circumferential side of the optical disc 3, corresponding to the slipping process.

The temporary suspension of writing means suspension of writing of data to be recorded, and hence includes not only the case in which neither pit row nor mark row is formed by actually stopping the operation of boosting the laser power of the laser beam, but also the case in which dummy data is recorded instead of the data to be recorded. Note that determination as to the presence of defects is executed in the same manner as in the first or second embodiment.

Similar advantages to those in the above-described embodiments can also be obtained with this third embodiment by temporarily suspending the operation of recording based on determination as to the presence of defects.

(4) Fourth Embodiment

In this embodiment, the so-called alternative process is executed if the determination result shows a difficulty in correctly reducing data. The alternative process is executed based on the determination result SJ as appropriate, or is executed after holding associated data temporarily and waiting completion of a series of processes corresponding to demands for writing issued from the host unit 2. Note that determination as to the presence of defects is executed in the same manner as in the first or second embodiment.

Similar advantages to those in the above-described embodiments can also be obtained with this fourth embodiment by executing the alternative process based on the determination result.

(5) Fifth Embodiment (5-1) Construction of Fifth Embodiment

Figure 6:
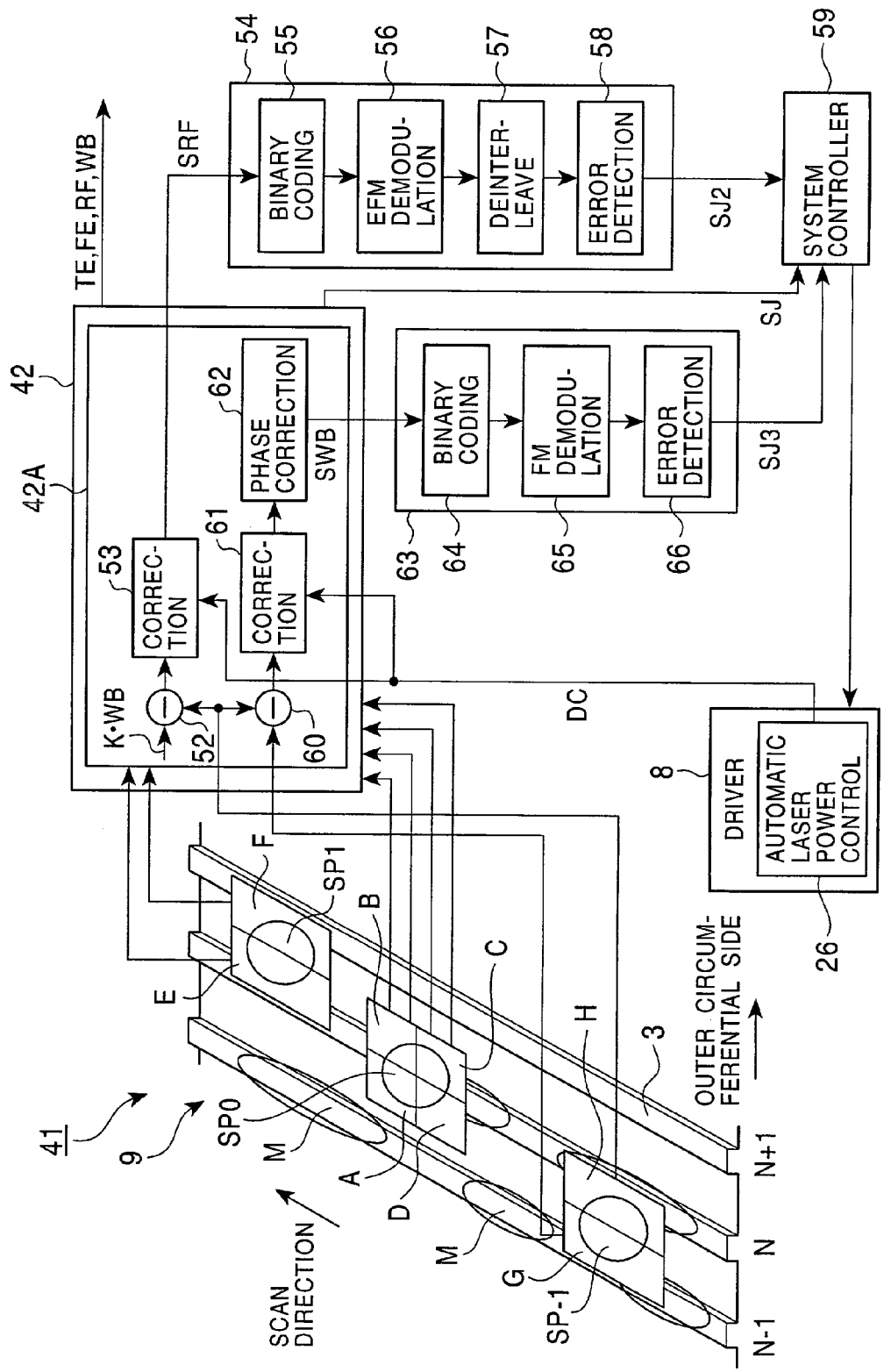
FIG. 6 is a block diagram showing an optical disc device according to a fifth embodiment of the present invention.

FIG. 6 is a block diagram showing, in comparison with FIG. 1, an optical disc device according to a fifth embodiment of the present invention. In an optical disc device 41 of this embodiment, an RF processing circuit 42, an error detection circuit unit 54, a system controller 59, and an error detection circuit unit 63 are employed instead of the RF processing circuit 10 and the system controller 13 described above in connection with the first embodiment. In the construction shown in FIG. 6, the same components as those in the first embodiment are denoted by corresponding symbols and a description thereof is omitted here.

As with the RF processing circuit 10 described above in connection with the first embodiment, the RF processing circuit 42 generates the tracking error signal TE, the focusing error signal FE, the wobble signal WB, and the reproduction signal RF through the arithmetic operations expressed by the formulae (1). Also, as with the RF processing circuit 10, the RF processing circuit 42 processes, in a computing circuit 42A, the light detection results obtained from the areas E and F on the preceding side in a computing circuit 42A, thereby outputting the determination result SJ.

Further, the RF processing circuit 42 inputs, to a subtracter 52 of the computing circuit 42A, the light detection result obtained from one of the areas G and H corresponding to the sub-beam spot on the succeeding side, i.e., from the area H that is positioned on the side nearer to the main beam spot SP0 and located on the side undergoing an effect of the light returned from pits or marks formed in or on the optical disc 3 by the main beam spot SP0, after the light detection result has been subjected to current-to-voltage conversion.

Then, the subtracter 52 of the computing circuit 42A subtracts, from the inputted light detection result, the wobble signal K·WB that has been corrected in phase and amplitude, thereby suppressing the signal level of a component contained in the inputted light detection result and changed with the meandering form of the groove. Further, a succeeding correction circuit 53 corrects the signal level of the inputted light detection result based on the laser power detection result DC for the irradiated laser beam, which is detected and outputted from the automatic laser power control circuit 26, thereby suppressing the signal level of a component varied upon boosting of the laser power of the laser beam. As a result, the computing circuit 42A generates, from the return light corresponding to the sub-beam spot, a sub-reproduction SRF whose signal level varies depending on the pit row or the mark row formed by the main beam spot in or on the optical disc 3.

Further, in the computing circuit 42A, the light detection result obtained from the area H and subjected to current-to-voltage conversion is inputted to another subtracter 60 along with the light detection result obtained from the area G in a pair with the area H and subjected to current-to-voltage conversion. In the computing circuit 42A, therefore, a sub-wobble signal denoted by G-H using the alphabets of the areas G and H is generated. Herein, the sub-wobble signal has a signal level varied depending on the meandering form of the groove defining an adjacent track as well because the corresponding sub-beam spot is offset toward the side of the adjacent track. Further, the signal level of the sub-wobble signal varies upon boosting of the laser power of the laser beam. In addition, the signal level of the sub-wobble signal reflects the degree of thermal interference caused upon recording of data by the main beam spot SP0. The term "thermal interference" means a phenomenon of leakage of information from an adjacent track, which occurs when a pit or a mark is not formed in normal size in a direction perpendicular to the direction in which a pit row or a mark row is to be formed, at the time of recording the information with local heating of the information recording surface. If the thermal interference becomes significant in an optical disc of the type used in the present invention, address data pre-coded in the optical disc in the form of meandering of the groove can no longer be correctly reproduced. This results in a difficulty in correctly reproducing data recorded as pit rows or mark rows based on that address data.

Subsequently, in the computing circuit 42A, an output signal of the subtracter 60 is inputted to a correction circuit 61. The correction circuit 61 corrects the signal level of the inputted light detection result based on the laser power detection result DC for the irradiated laser beam, which is detected and outputted from the automatic laser power control circuit 26, thereby suppressing the signal level of a component varied upon boosting of the laser power of the laser beam.

Furthermore, in the computing circuit 42A, an output signal of the correction circuit 61 is inputted to a phase correction circuit 62, in which the signal phase is corrected to suppress a signal component having a signal level varied with the meandering form of the groove defining an adjacent track, thereby eliminating an effect imposed from the adjacent track. As a result, the computing circuit 42A generates a sub-wobble signal SWB having a signal level, which varies depending on the meandering form defining the groove scanned by the main beam spot SP0 and reflects the effect of thermal interference.

The error detection circuit unit 54 processes the sub-reproduction signal SRF and outputs a determination result SJ2 as to whether data recorded by the main beam spot SP0 can be correctly reproduced. More specifically, in the error detection circuit unit 54, a binary coding circuit 55 converts the sub-reproduction signal SRF into binary values and outputs reproduction data. Then, a succeeding EFM (Eight to Fourteen Modulation) demodulation circuit 56 executes EFM demodulation of the reproduction data. A succeeding deinterleaving circuit 57 receives data outputted from the EFM demodulation circuit 56 and outputs it after deinterleaving. Through the above-described processes, the error detection circuit unit 54 reproduces, from the sub-reproduction signal SRF, user data and the error correction code added to the user data.

A succeeding error detection circuit 58 receives data outputted from the deinterleaving circuit 57, executes an error detection process based on the error correcting code added to the received data, and then outputs the error detection (determination) result SJ2 to the system controller 59.

On the other hand, the error detection circuit unit 63 processes the sub-reproduction signal SWB and outputs a determination result SJ3 as to whether address data recorded in the form of meandering of the groove can be correctly reproduced for the track on which data is recorded by the main beam spot SP0. More specifically, in the error detection circuit unit 63, a binary coding circuit 64 converts the sub-wobble signal SWB into binary values and outputs binary data. Then, a succeeding FM (Frequency Modulation) demodulation circuit 65 executes FM demodulation of the binary data to reproduce the address data recorded in the form of meandering of the groove.

A succeeding error detection circuit 66 receives the address data reproduced by the FM demodulation circuit 65, executes an error detection process based on the error correcting code added to the received address data, and then outputs the error detection (determination) result SJ3 to the system controller 59.

The system controller 59 is a controller for controlling the overall operation of the optical disc device 41. Similarly to the system controller 13 in the above-described embodiments, the system controller 59 controls the overall operation in response to requests from the host unit 2 so that data supplied from the host unit 2 is recorded on the optical disc 3 and data recorded on the optical disc 3 is reproduced and outputted to the host unit 2.

Also, when the RF processing circuit 42 outputs the defect determination result SJ based on the sub-beam spot SP1 on the preceding side, the system controller 59 instructs the automatic laser power control circuit 26 to change the amount of light for writing, whereby the laser power of the laser beam is boosted in the area containing defects to prevent deterioration in the error rate.

Further, in parallel to the above-described processing in accordance with the defect determination result SJ, the system controller 59 monitors the error detection results SJ2, SJ3 obtained respectively from the error detection circuits 54, 63. If an error in excess of a predetermined level is detected, the system controller 59 suspends the writing and controls the overall operation such that data corresponding to a subsequent area is rerecorded. Such a process of rerecording data is executed when an error being difficult to correct is detected in the reproduction data provided as the sub-reproduction signal SRF, and when an error being difficult to correct is detected in number exceeding a predetermined value in the address data obtained from the sub-wobble signal SWB. As a result, the system controller 59 executes the alternative process as the so-called slipping process when a satisfactory error rate cannot be ensured in the defective area even if user data is recorded with the boosted laser power of the laser beam, when a satisfactory error rate cannot be ensured in spite of any abnormality being not defected based on the sub-beam spot on the preceding side, and when satisfactory reliability of the address data cannot be ensured because of thermal interference.

In this embodiment described above, the light receiving surface made up of the areas G and H constitutes light receiving means for receiving the return light corresponding to the sub-beam spot SP-1 formed on the succeeding side with respect to the scan of the main beam spot SP0. The computing circuit 42A constitutes correcting means for suppressing not only changes in signal level of the light detection result caused upon boosting of the laser power of the laser beam, but also changes in signal level of the light detection result caused with meandering of the groove formed in the optical disc for correction of the sub-reproduction signal SRF. The error detection circuit unit 54 constitutes determining means for determining an error in the data recorded on the optical disc by the main beam spot. The error detection circuit unit 63 constitutes determining means for determining an error in the address data, which is reproduced from the optical disc, based on the light detection result obtained as described above.

(5-2) Operation of Fifth Embodiment

In the optical disc device 41 (FIG. 6) having the above-described construction, the laser beam emitted from a semiconductor laser is decomposed into diffracted lights of −1, 0 and +1 orders, which are irradiated to the optical disc 3. Those diffracted lights of −1, 0 and +1 orders form the sub-beam spot SP-1, the main beam spot SP0 and the sub-beam spot SP1, respectively, on the information recording surface of the optical disc 3. Then, return lights corresponding to the sub-beam spot SP-1, the main beam spot SP0 and the sub-beam spot SP1 are introduced to the detector 9 and received by the light receiving surface made up of the areas G and H, the light receiving surface made up of the areas A to D, and the light receiving surface made up of the areas E and F, respectively.

Further, in the optical disc device 41, the light detection results obtained from the areas A to H are processed in the RF processing circuit 42 through current-to-voltage conversion and then matrix operations, thereby generating the tracking error signal TE, the focusing error signal FE, the wobble signal WB, and the reproduction signal RF. Tracking control and focusing control of the optical pickup 6 are performed in accordance with the tracking error signal TE and the focusing error signal FE.

Then, in the optical disc device 41, when reproduction of data from the optical disc 3 is instructed from the host unit, the reproduction signal RF outputted from the RF processing circuit 42 is processed by the digital processing circuit 12 and the encoder/decoder 15 successively to reproduce the data recorded on the optical disc 3. The data thus reproduced is outputted to the host unit.

On the other hand, when recording of data is instructed from the host unit, user data inputted via the interface 16 is processed by the encoder/decoder 15 and then by the digital processing circuit 12 to generate a recording signal, which is used for control of the laser beam. The operation of the driver 8 in the optical pickup 6 is controlled in accordance with the recording signal so that the laser power of the laser beam irradiated to the optical disc 3 is intermittently boosted from a level for reproduction to a level for writing. As a result, pit rows or mark rows are formed in or on the optical disc 3 by the main beam spot SP0.

In the optical disc device 41, when recording data on the optical disc 3 with the main beam spot SP0 as described above, the light detection results E and F obtained corresponding to the sub-beam spot SP1, which is positioned on the preceding side with respect to the main beam spot SP0, are added in the computing circuit 42A of the RF processing circuit 42. Subsequently, the resultant sum is processed so as to suppress not only the signal level of a component varied depending on the meandering form of the groove, but also the signal level of a component varied upon boosting of the laser power of the laser beam. In the optical disc device 41, therefore, for an area which is going to be scanned by the main beam spot SP0, it is possible to obtain the light detection result indicating the reflectance of the information recording surface in that area before the scan of the main beam spot SP0. Based on determination of the signal level of the light detection result, the presence or absence of defects is determined for the area which is going to be scanned by the main beam spot SP0.

Thus, in the optical disc device 41, whether data can be correctly reproduced is determined based on the reflectance of the information recording surface. For the area in which it is difficult to correctly reproduce data, the amount of light for writing is boosted under control of the system controller 59. Consequently, deterioration in the error rate can be effectively avoided.

Also, the light detection result obtained from the area H with scan of the sub-beam spot upon the optical disc 3 succeeding to the main beam spot SP0 is inputted to the computing circuit 42A of the RF processing circuit 42. The inputted light detection result is subjected to subtraction in the subtracter 52 and then correction of its signal level in the correction circuit 53, thereby suppressing not only the signal level of a component varied depending on the meandering form of the groove, but also the signal level of a component varied upon boosting of the laser power of the laser beam. In the optical disc device 41, therefore, for an area which has been just scanned by the main beam spot SP0, it is possible to obtain the sub-reproduction signal SRF from the sub-beam spot SP-1. The sub-reproduction signal SRF is processed in the same manner as the user-data reproduction signal RF to provide the error detection result SJ2.

Accordingly, the optical disc device 41 is able to confirm whether data can be correctly reproduced, by effectively utilizing the sub-beam spot. To that end, in the optical disc device 41, the light detection result is processed in the computing circuit 42A so as to suppress the signal level of a component varied upon boosting of the laser power of the laser beam, and the confirming process is executed based on the processed result substantially in parallel to the recording, whereby a correct determination result is ensured. As a result, a reduction of the data transfer rate can be effectively avoided, and whether data can be correctly reproduced can be confirmed with a simple construction.

Further, in the optical disc device 41, the light detection result obtained from the area H with scan of the sub-beam spot upon the optical disc 3 succeeding to the main beam spot SP0 is inputted to the subtracter 60 along with the light detection result obtained from the area G in a pair with the area H, thereby generating the sub-wobble signal SWB having a signal level which varies depending on the meandering form of the groove and reflects an effect of thermal interference. More specifically, in the optical disc device 41, the sub-wobble signal SWB is subjected to correction of the signal level in the correction circuit 61 and correction of the phase in the phase correction circuit 62, thereby suppressing not only changes in signal level caused upon boosting of the laser power of the laser beam, but also changes in signal level caused with the meandering form of the groove defining an adjacent track. As a result, the sub-wobble signal SWB simply reflecting the effect of thermal interference is generated.

Subsequently, in the optical disc device 41, the error detection circuit unit 63 decodes the sub-wobble signal SWB to reproduce address data, and detects an error of the address data. The error detection result SJ3 thus obtained is inputted to the system controller 59.

As a result, the optical disc device 41 is also able to detect the case in which the address data as a reference during reproduction cannot be correctly reproduced, and hence to indirectly confirm whether the data recorded by the main beam spot SP0 can be correctly reproduced.

Thus, in the optical disc device 41, high reliability can be ensured by suspending the recoding of data and rerecording it, as required, in accordance with the error detection result SJ2 obtained based on the sub-reproduction signal SRF. Also, by combining such a rerecording process with the process of boosting the laser power of the laser beam in accordance with the result of defect detection executed prior to scan of the main beam spot, the optical disc device 41 is able to achieve effective utilization of the information recording surface and to record desired data with higher reliability than the case of simply recording data in constant amount of light and verifying the recording of the data.

Further, in the case in which it is determined from the sub-reproduction signal SRF that the data recorded by the main beam spot SP0 can be correctly reproduced, but it is determined from the sub-wobble signal SWB that the address data cannot be correctly reproduced in excess of a predetermined criterion, the data recorded by the main beam spot SP0 cannot be correctly reproduced eventually. In that case, therefore, recording of data is suspended and the data is rerecorded as with the above case. Hence, higher reliability is ensured.

(5-3) Advantages of Fifth Embodiment

With the construction shown in FIG. 6, the result of detecting the return light corresponding to the sub-beam spot used for the tracking control, which is positioned on the succeeding side with respect to the scan of the main beam spot used for recording, is processed so as to suppress changes in signal level caused upon the writing and to determine whether the recorded data and the address data can be correctly reproduced. Consequently, whether data can be correctly reproduced can be confirmed with a simple construction while effectively avoiding a reduction of the data transfer rate.

Also, in addition to suppressing of changes in signal level caused upon the writing, the sub-reproduction signal is processed so as to suppress changes in signal level of the light detection caused with meandering of the groove formed in the optical disc. It is therefore possible to effectively avoid an adverse effect due to the meandering form of the groove, and to confirm with high accuracy whether data can be correctly reproduced.

Further, whether the recorded data can be correctly reproduced is determined by selectively processing the light detection result obtained from one of the radially divided areas of the light receiving surface receiving the sub-beam spot on the preceding side, which is positioned on the side nearer to the main beam spot. It is therefore possible to effectively avoid an effect of the data recorded on an adjacent track, and to determine whether data can be correctly reproduced.

(6) Sixth Embodiment

Figure 7:
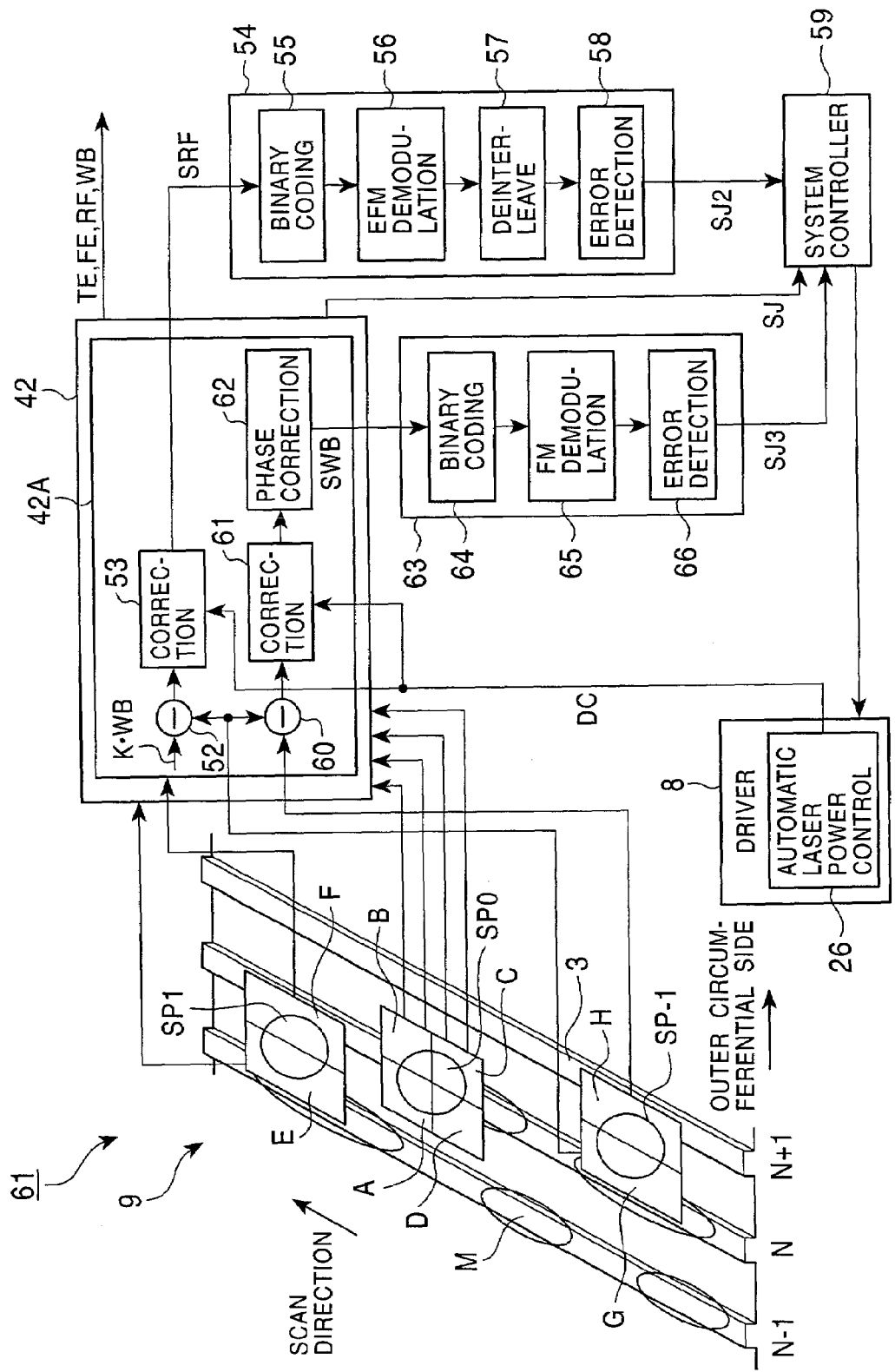
FIG. 7 is a block diagram showing an optical disc device according to a sixth embodiment of the present invention.

FIG. 7 is a block diagram showing, in comparison with FIGS. 5 and 6, an optical disc device according to a sixth embodiment of the present invention. In the construction shown in FIG. 7, the same components as those in the constructions shown in FIGS. 5 and 6 are denoted by corresponding symbols and a description thereof is omitted here.

As with the optical disc device 31 according to the second embodiment, in an optical disc device 61 of this embodiment, the presence of a defective area is determined prior to scan of the main beam spot SP0 based on the light detection result obtained from the area F of the light receiving surface on the preceding side, and the laser power of the laser beam is boosted based on a determination result. Thus, whether data can be correctly reproduced is confirmed by effectively utilizing the sub-beam spot on the preceding side, and deterioration in the error rate is prevented with such confirmation.

Also, the light detection result obtained from the area G of the light receiving surface on the succeeding side, which is positioned on the side nearer to the main beam spot, is processed by the computing circuit 42A to generate the sub-reproduction signal SRF. Then, the sub-reproduction signal SRF is processed by the error detection circuit unit 54 to confirm whether the data immediately after being recorded can be correctly reproduced, while effectively avoiding an adverse effect imposed from an adjacent track. Further, the alternative process is executed as the so-called slipping process based on a confirmation result.

Moreover, the light detection result obtained from the area G and the light detection result obtained from the area H in a pair with the area G are inputted to the subtracter 60 to generate the sub-wobble signal SWB. The sub-wobble signal SWB is processed by the correction circuit 61 and the phase correction circuit 62 successively. Then, an output signal of the phase correction circuit 62 is processed by the error detection circuit unit 63 to obtain the error detection result SJ3. Whether the address data can be correctly reproduced is confirmed based on the error detection result SJ3. Further, the alternative process is executed as the so-called slipping process based on a confirmation result.

With the construction shown in FIG. 7, even when each of the two sub-beam spots is positioned on the preceding side in either radial or circumferential direction, but on the succeeding side in either radial or circumferential direction, it is possible to effectively avoid an adverse effect imposed from an adjacent track, and to confirm whether the data immediately after being recorded and the address data can be correctly reproduced.

(7) Other Embodiments

The above embodiments have been described in connection with the case in which the reflectance detection signal S1 is generated by correcting the signal level of the light detection result based on the result of detecting the laser power of the laser beam so as to suppress the signal level of a component varied upon boosting of the laser power of the laser beam. However, the present invention is not limited to such a case. The reflectance detection signal S1 may be generated by sampling the signal level of the light detection result at the timing at which the laser power of the laser beam is substantially constant, and selectively processing the light detection result with a window comparator so that the signal level of a component varied upon boosting of the laser power of the laser beam is suppressed.

Also, the above embodiments have been described in connection with the case in which the determination result, which is obtained by determining a difficulty in correct reproduction of data based on defect detection, is utilized only in recording. However, the present invention is not limited to such a case, and the determination result may be utilized in reproduction as well. In other words, on an assumption that bit errors being difficult to correct always occur, the operation of the error correction circuit may be switched over to enhance the error correction capability and to reproduce data with higher reliability. When utilizing the determination result in reproduction, it is conceivable to, instead of correcting the light detection result based on the laser power of the laser beam, selectively process the light detection result in an area where pits, lands, spaces or marks are formed in length at which there occurs no interference between detected codes due to resolution of an optical system, including the size of a beam spot.

Further, the above embodiments have been described in connection with the case in which a difficulty in correctly reproducing data is determined when a defect in excess of the predetermined size is detected and when defects occur at noticeable frequency. However, the present invention is not limited to such a case, and the determination may be made based on either criterion if such a method is satisfactory from the practical point of view. Additionally, the determination may be made by any other suitable method such as simply resorting to the reflectance value, for example, other than those described above. The determination based on the reflectance value makes it is possible to discriminate an area in which the reflectance value is high and an area in which the reflectance value is low. It is thought that, in the area in which the reflectance value is low, the temperature of the information recording surface rises to a higher level upon irradiation of the laser beam. When utilizing the determination based on the reflectance value, therefore, deterioration in the error rate can be effectively avoided by increasing the laser power of the laser beam in the area in which the reflectance value is high, and reducing the laser power of the laser beam in the area in which the reflectance value is low. Thus, deterioration in the error rate can be more effectively avoided by changing the laser power of the laser beam in a flexible manner instead of simply increasing the laser power of the laser beam.

While the fifth and sixth embodiments have been described in connection with the case in which whether data can be correctly reproduced is confirmed by detecting a defective area and reproducing the data immediately after being recorded, the present invention is not limited to such a case, and the process of detecting a defective area may be omitted as required.

Also, while the fifth and sixth embodiments have been described in connection with the case in which the alternative process is executed as the so-called slipping process upon detection of an error, the present invention is not limited to such a case. For example, when the optical disc device is employed as an external storage unit of a computer, the user may be notified of the occurrence of an error via the host unit after suspension of the recording, and may be prompted to instruct execution of subsequent processing. It is also possible instead to execute the alternative process by rerecording the relevant data in an alternative area, or to make a retry.

Further, while the fifth and sixth embodiments have been described in connection with the case in which the sub-reproduction signal SRF is processed by the dedicated error detection circuit unit, the present invention is not limited to such a case, and an error may be detected using the error detecting system for reproduction.

Moreover, while the fifth and sixth embodiments have been described in connection with the case in which the sub-wobble signal SWB is processed by the dedicated error detection circuit unit, the present invention is not limited to such a case, and an error may be detected using the circuit system for processing the wobble signal based on the arithmetic operations expressed by the formulae (1).

While the fifth and sixth embodiments have been described in connection with the case in which the process for dealing with an error is executed based on the error detection results obtained from both the sub-reproduction signal SRF and the sub-wobble signal SWB, the present invention is not limited to such a case, and the process for dealing with an error may be executed based one of the error detection results as required.

While the fifth and sixth embodiments have been described in connection with the case in which the error detection is executed using the error correcting code, the present invention is not limited to such a case, and the error detection may be executed by comparing the reproduced data with the data stored in a memory during the recording.

The above embodiments have been described in connection with the case in which changes in signal level caused with the meandering form of the groove are suppressed by subtracting, from the signal level of the light detection result, the wobble signal having been corrected in phase and amplitude. However, the present invention is not limited to such a case, and changes in signal level caused with the meandering form of the groove may be suppressed by holding down a component in the frequency band of the wobble signal with a band suppressing filter, for example.

The above embodiments have been described in connection with the case in which the light detection result is processed so as to suppress changes in signal level caused with the meandering form of the groove. However, the present invention is not limited to such a case. In some optical discs, address is recoded in the form of prepits instead of meandering of the groove. For those optical discs, the process of suppressing changes in signal level caused with the meandering form of the groove can be dispensed with. In that case, an adverse effect upon the determination result from the prepits can be avoided, for example, by masking light detection result as required at the timing at which an area containing the prepits is scanned.

While the fifth and sixth embodiments have been described in connection with the case in which whether the data recorded by the main beam spot can be correctly reproduced is confirmed by selectively processing the light detection result obtained from the area of the light receiving surface on the succeeding side, which is positioned on the side nearer to the main beam spot, the present invention is not limited to such a case. Whether the recorded data can be correctly reproduced may be confirmed in a similar manner by using the light detection result obtained from the area G in the fifth embodiment and the light detection result obtained from the area E in the sixth embodiment. More specifically, the area G used in the fifth embodiment is an area that belongs to the light receiving surface positioned on the succeeding side in both the radial and circumferential directions of the optical disc 3 and receives the return light corresponding to the beam spot irradiated to an adjacent track. The area E used in the sixth embodiment is an area that belongs to the light receiving surface positioned on the preceding side in the circumferential direction, but on the succeeding side in the radial direction, and receives the return light corresponding to the beam spot irradiated to an adjacent track. With that modification, whether the data recorded by the main beam spot can be correctly reproduced is confirmed at a delay of a time required for the optical disc 3 to make a turn.

Figure 8:
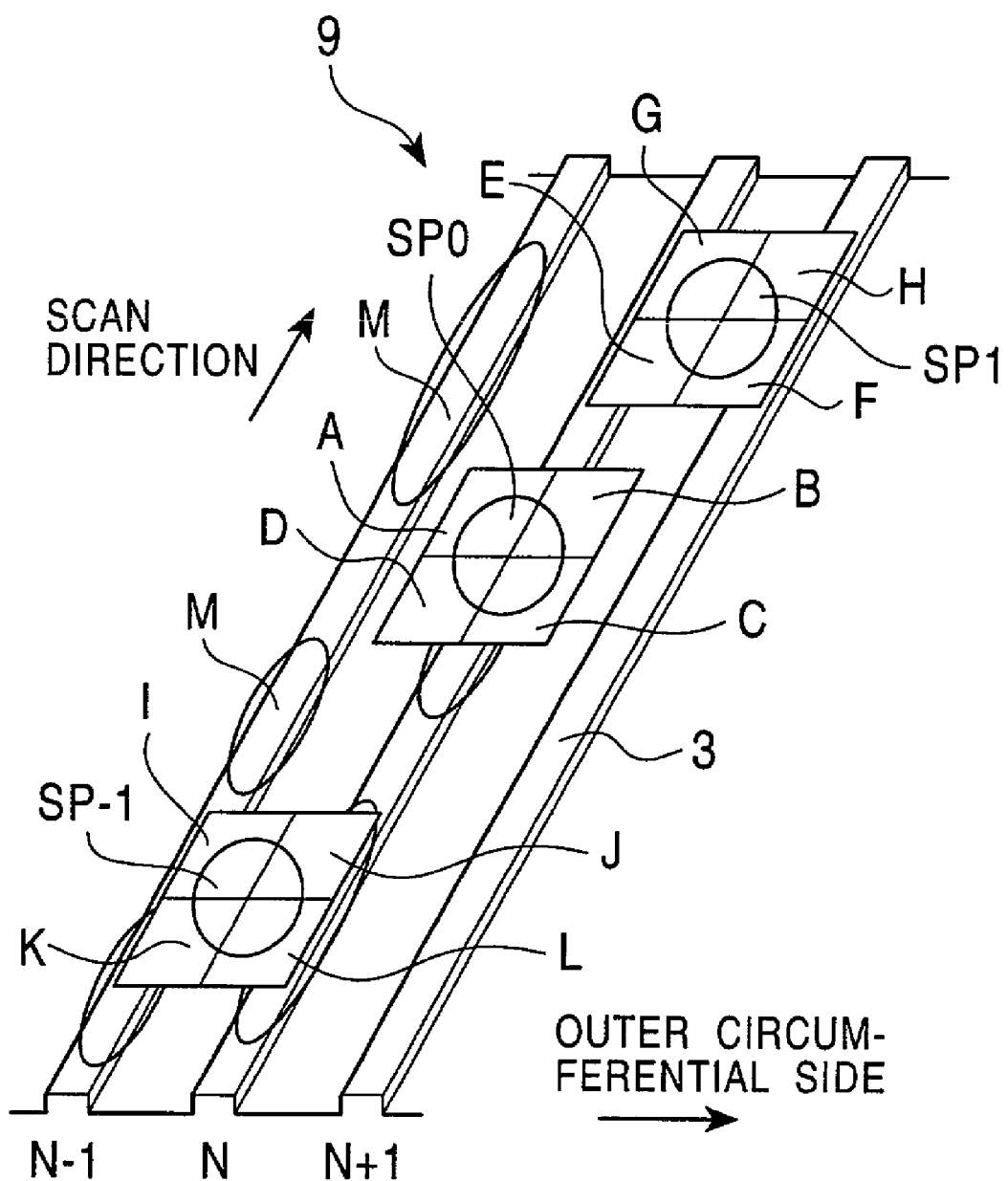
FIG. 8 is a perspective view for explaining an optical disc device according to still another embodiment of the present invention.
Figure 9:
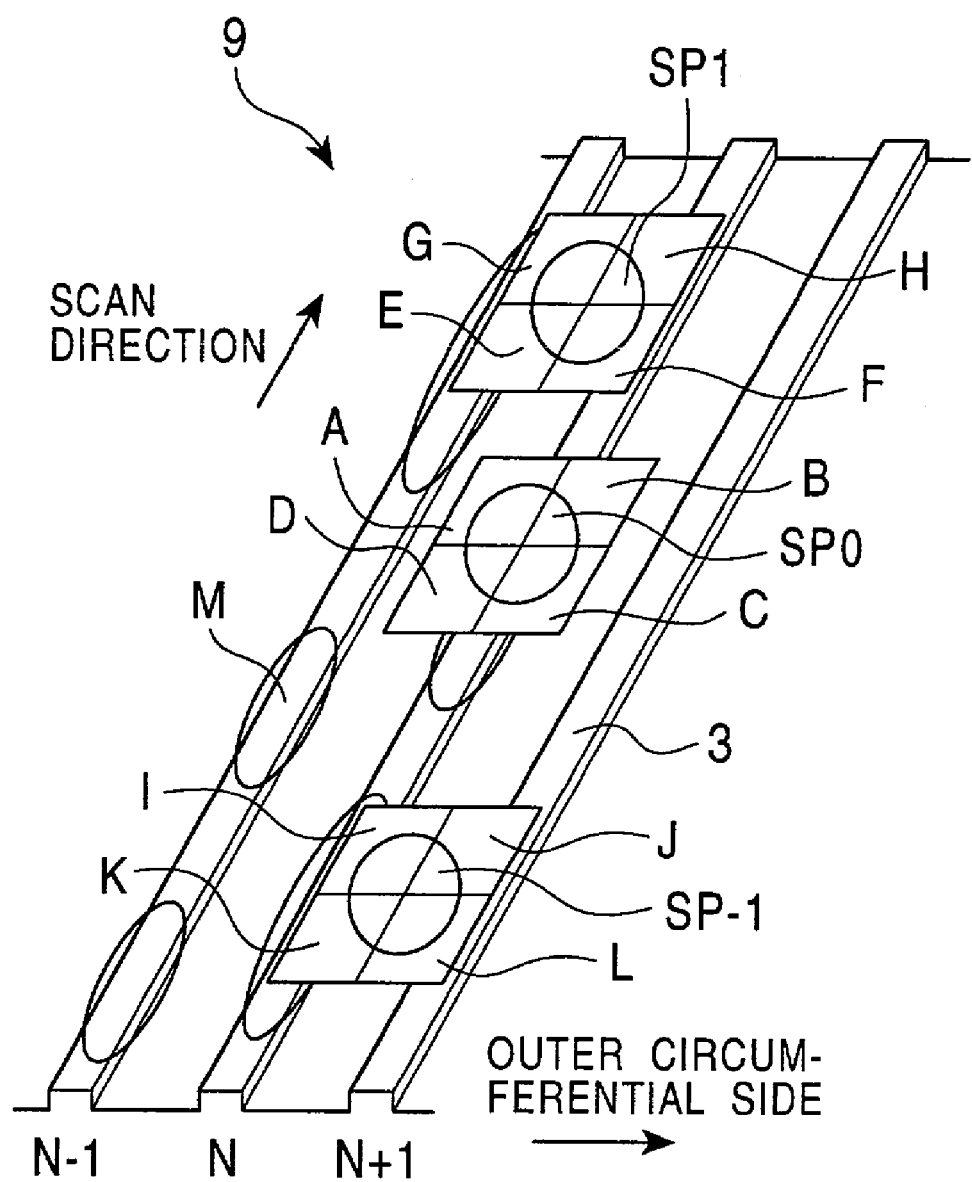
FIG. 9 is a perspective view for explaining an optical disc device according to still another embodiment of the present invention, in which light receiving surfaces are arranged in a different manner from those in FIG. 8.

The above embodiments have been described in connection with the case of generating the tracking error signal by the DPP method. However, the present invention is not limited to such a case, but applicable to various cases, for example, one generating the tracking error signal by the 3-spot method. More specifically, as shown in FIGS. 8 and 9 in comparison with FIGS. 1 and 5, the optical disc device may be modified to generate the tracking error signal by the DPD (Differential Phase Detection) method by constructing the optical pickup such that the light receiving surface corresponding to each sub-beam spot is also divided into four areas in both the circumferential and radial directions similarly to the light receiving surface corresponding to the main beam spot. In that case, each of the areas used for the defect detection and the data reproduction, which are described above with reference to FIGS. 1 and 5, is divided in the circumferential direction of the optical disc as well. Similar advantages to those in the above-described embodiments can be obtained by processing respective light detection results obtained from the divided two areas using a sum signal of both light detection results or those individual results.

In the embodiment of FIG. 8, the defect detection can be performed by processing the light detection result obtained from the area E or G, or a sum signal of both light detection results obtained from the areas E and G. Also, the data recorded by the main beam spot can be reproduced by processing the light detection result obtained from the area J or L, or a sum signal of both light detection results obtained from the areas J and L, and by processing the light detection result obtained from the area I or K, or a sum signal of both light detection results obtained from the areas I and K. In the embodiment of FIG. 9, the defect detection can be performed by processing the light detection result obtained from the area F or H, or a sum signal of both light detection results obtained from the areas F and H. Also, the data recorded by the main beam spot can be reproduced by processing the light detection result obtained from the area I or K, or a sum signal of both light detection results obtained from the areas I and K, and by processing the light detection result obtained from the area G or E, or a sum signal of both light detection results obtained from the areas G and E.

The above embodiments have been described in connection with the case in which the present invention is applied to the optical disc device for recording and reproducing data on and from a CD, a CD-ROM, a CD-R and a CD-RW. However, the present invention is not limited to such a case, but applicable to a variety of optical disc devices for accessing various types of optical discs including, e.g., a DVD-RW.

According to the present invention, as described above, whether data can be correctly reproduced can be confirmed with a simple construction while effectively avoiding a reduction of the data transfer rate, by suppressing changes in signal level caused upon boosting of the laser power of the laser beam and detecting the presence of defects on the optical disc based on the result of detecting the return light corresponding to the sub-beam spot used for the tracking control, which is formed on the preceding side with respect to the scan of the main beam spot used for recording. Also, whether data can be correctly reproduced can be confirmed with a simple construction while effectively avoiding a reduction of the data transfer rate, by suppressing changes in signal level caused upon writing of data and determining whether the recorded data and the address data can be correctly reproduced, based on the result of detecting the return light corresponding to the sub-beam spot used for the tracking control, which is formed on the succeeding side with respect to the scan of the main beam spot used for the recording.

What is claimed is:

1. An optical disc device in which a main beam spot and sub-beam spots are formed on an information recording surface of an optical disc with irradiation of a laser beam, and laser power of said laser beam is intermittently boosted to record desired data on said optical disc by said main beam spot, said optical disc device comprising:

light receiving means for receiving return light, said return light corresponding to said sub-beam spots and said main beam spot, said sub-beam spots including a sub-beam spot formed at a preceding side with respect to a scan of said main beam spot and, for outputting a light detection result;

correcting means for suppressing changes in signal level of the light detection result caused upon boosting of the laser power of said laser beam and for subtracting information from said return light portion corresponding to said preceding sub-beam spot, said information being a portion of said return light corresponding to the main beam spot; and determining means for determining the light detection result obtained through said correcting means, and detecting defects on said optical disc.

2. An optical disc device according to claim 1, wherein said information corresponding to said main beam spot is wobble signal.

3. An optical disc device according to claim 1, wherein said sub-beam spots are formed as a pair of beam spots produced on the preceding and succeeding scan sides of said main beam spot; and said sub-beam spot formed on the preceding side is one of said pair of beam spots, which precedes in both circumferential and radial directions of said optical disc.

4. An optical disc device according to claim 1, wherein said sub-beam spots are formed as a pair of beam spots produced on the preceding and succeeding sides of said main beam spot;

said optical disc device includes light receiving devices for receiving said pair of beam spots, respectively, and processes light detection results of said light receiving devices to generate a tracking error signal, each of said light receiving devices having a light receiving surface divided by a division line extending in the circumferential direction of said optical disc; and said light receiving means is one of divided areas of said light receiving surface.

5. An optical disc device according to claim 1, wherein an amount of light for writing is changed in a defective area based on a determination result of said determining means.

6. An optical disc device according to claim 1, wherein a writing process is temporarily suspended in a defective area based on a determination result of said determining means.

7. An optical disc device according to claim 1, wherein an alternative process is executed on data, which is assigned to writing to be made in a defective area, based on a determination result of said determining means.

8. An optical disc device comprising:

a light source for emitting a laser beam;

a diffraction grating configured to generate a main optical beam and at least first and second optical beams from the laser beam emitted from said light source, and configured to form a main beam spot and sub-beam spots on an information recording surface of an optical disc;

a photo detector configured to receive return light; corresponding to said sub-beam spots and said main beam spot, said sub-beam spots include a sub-beam spot being formed at a preceding side with respect to scan of said main beam spot, and configured to subtract information from said return light portion corresponding to said preceding sub-beam spot, said information being a portion of said return light corresponding to said main beam spot, outputting a light detection result; and a determination circuit configured to determine the light detection result of said photo detector, and configured to detect defects on said optical disc.

9. An optical disc device according to claim 8, wherein said optical disc device further comprises a correction circuit for suppressing changes in signal level of the light detection result caused upon boosting of laser power of said laser beam; and said determination circuit determines the light detection result obtained through said correction circuit, and detects defects on said optical disc.

10. An optical disc device according to claim 8, wherein said information corresponding to said main beam spot is wobble signal.

11. An optical disc device according to claim 8, wherein said sub-beam spots are formed as a pair of beam spots produced on both sides of said main beam spot; and said sub-beam spot formed on the preceding side is one of said pair of beam spots, which precedes in both circumferential and radial directions of said optical disc.

12. An optical disc device according to claim 8, wherein said sub-beam spots are formed as a pair of beam spots produced on both sides of said main beam spot; and said optical disc device includes light receiving devices for receiving said pair of beam spots, respectively, and processes light detection results of said light receiving devices to generate a tracking error signal, each of said light receiving devices having a light receiving surface divided by a division line extending in the circumferential direction of said optical disc.

13. An optical disc device according to claim 8, wherein an amount of light for writing is changed in a defective area based on a determination result of said determination circuit.

14. An optical disc device according to claim 8, wherein a writing process is temporarily suspended in a defective area based on a determination result of said determination circuit.

15. An optical disc device according to claim 8, wherein an alternative process is executed on data, which is assigned to writing to be made in a defect containing area, based on a determination result of said determination circuit.

16. A control method for an optical disc device in which a main beam spot and sub-beam spots are formed on an information recording surface of an optical disc with irradiation of a laser beam, and laser power of said laser beam is intermittently boosted to record desired data on said optical disc by said main beam spot, said method comprising:

suppressing changes in signal level according to a light detection result due to boosting of the laser power of said laser beam, the light detection result being obtained by receiving a return light corresponding to said sub-beam spots and said main beam spot, said sub-beam spots including a sub-beam spot being formed at a preceding side with respect to scan of said main beam spot;

subtracting information from said return light portion corresponding to said preceding sub-beam spot, said information being a portion of said return light corresponding to said main beam spot; and determining the light detection result and detecting defects on said optical disc.

* * * * *